(12) United States Patent
Kang et al.

(10) Patent No.: US 7,679,376 B2
(45) Date of Patent: Mar. 16, 2010

(54) CAPACITIVE SENSOR FOR SENSING TACTILE AND PROXIMITY, AND A SENSING SYSTEM USING THE SAME

(75) Inventors: Sungchul Kang, Seoul (KR); Munsang Kim, Seoul (KR); Euisik Yoon, Plymouth, MN (US); Hyung-Kyu Lee, Minneapolis, MN (US); Sun-Il Chang, Saint Paul, MN (US); Junho Choi, Seoul (KR)

(73) Assignees: Korea Institute of Science and Technology, Seoul (KR); The Regents of the University of Minnesota, Saint Paul, MN (US)

( * ) Notice: Subject to any disclaimer, the term of this patent is extended or adjusted under 35 U.S.C. 154(b) by 526 days.

(21) Appl. No.: 11/655,356

(22) Filed: Jan. 19, 2007

(65) Prior Publication Data

US 2008/0174321 A1 Jul. 24, 2008

(51) Int. Cl.
*G01R 27/26* (2006.01)
(52) U.S. Cl. .................................. 324/658; 324/686
(58) Field of Classification Search ................ 324/658, 324/661–689; 73/862.046; 340/870.37
See application file for complete search history.

(56) References Cited

U.S. PATENT DOCUMENTS 5,166,679 A * 11/1992 Vranish et al. ......... 340/870.37
2006/0260417 A1 * 11/2006 Son et al. ............... 73/862.046

* cited by examiner

*Primary Examiner*—Vincent Q Nguyen
(74) *Attorney, Agent, or Firm*—Ohlandt, Greeley, Ruggiero & Perle, LLP

(57) ABSTRACT

A capacitive sensor includes an upper electrode layer having a plurality of electrodes disposed in line with each other, a lower electrode layer having a plurality of electrodes disposed in line with each other, an insulating layer disposed between the upper electrode layer and the lower electrode layer, and a layer of bumps made of insulating material formed above the area where the electrodes of the upper electrode layer and the electrodes of the lower electrode later are crossed. The sensor detects the proximity of approaching objects by the capacitance change between the electrodes disposed in the upper electrode layer, and detects the contact of any objects by the capacitance change between the electrodes of the upper electrode layer and the electrodes of the lower electrode layer.

12 Claims, 5 Drawing Sheets

CAPACITIVE SENSOR FOR SENSING TACTILE AND PROXIMITY, AND A SENSING SYSTEM USING THE SAME

BACKGROUND OF THE INVENTION

1. Field of the Invention

The present invention relates to a dual mode capacitive sensor which operates both as tactile sensor and proximity sensor. The foregoing sensor comprises an upper electrode layer in which a plurality of electrodes are disposed in line with each other; a lower electrode layer in which a plurality of electrodes are disposed in line with each other; and an insulating layer disposed between the above upper electrode layer and lower electrode layer. The sensor detects approaching objects by the capacitance change between adjacent upper electrodes, and detects any contact with objects by the capacitance change between the electrodes in the upper electrode layer and the electrodes in the lower electrode layer.

2. Description of the Prior Art

Sensors developed so far only operated either as a sensor detecting the shape of the object by detecting the distribution of the contact pressure when it came in contact with an object (tactile sensor) or as a sensor for detecting the proximity of an approaching object (proximity sensor). Such tactile sensor and proximity sensor are both essential to systems such as robots, etc. Therefore, there was a problem that if tactile sensors and proximity sensors are installed on a robot, the sensors required a large area and volume, and also burdened the signal lines and payload of the sensor.

SUMMARY OF THE INVENTION

Accordingly, the present invention is aimed at addressing the above issues and is capable of simultaneous operation as tactile sensor and proximity sensor. When an object approaches, the sensor detects the proximity of the object by the capacitance change between adjacent upper electrodes. When an object comes in contact with the sensor, the sensor detects the contact with objects using fringe capacitance change between the electrodes in the upper electrode layer and the electrodes in the lower electrode layer.

Therefore, the purpose of this invention is to provide a sensor which simultaneously operates as tactile sensor and proximity sensor. Further, the present invention provides a sensing system comprising the above sensor.

In order to achieve the above object, there is provided a capacitive dual mode sensor which can simultaneously operate as tactile sensor and proximity sensor.

The sensor according to this invention comprises an upper electrode layer in which a plurality of electrodes are disposed in line with each other; a lower electrode layer in which a plurality of electrodes are disposed in line with each other; and an insulating layer disposed between the upper electrode layer and the lower electrode layer.

The sensor detects the proximity of an object using fringe capacitance change between adjacent upper electrodes (proximity sensor mode). When an object comes in contact with the sensor, the sensor detects the contact with objects by the capacitance change between the electrodes in the upper electrode layer and the electrodes in the lower electrode layer (tactile sensor mode). Therefore, the sensor according to the present invention can simultaneously operate as tactile sensor and proximity sensor.

Further, the present invention relates to a sensing system comprising the above sensor.

The sensing system according to the present invention consists of a capacitive sensor comprising an upper electrode layer in which a plurality of electrodes are disposed in line with each other; a lower electrode layer in which a plurality of electrodes are disposed in line with each other; and an insulating layer disposed between the upper electrode layer and the lower electrode layer; a proximity detection circuit wherein the foregoing upper electrodes are divided into two groups and the detection circuit is electrically connected to each of them, and it detects the approaching objects using the capacitance change between the two groups of electrode; and a tactile detection circuit which is electrically connected to each of the upper electrodes and the lower electrodes and detects the object in contact using the capacitance change between the upper electrodes and the lower electrodes.

It is desirable that the foregoing sensing system further comprise a control unit which can control the operations. The control unit controls the operation by causing said sensing system to detect approaching objects using said proximity detection circuit, and then causing said sensing system to detect objects in contact using the tactile detection circuit when the distance to the approaching object detected by the proximity detection circuit is zero.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings. However, the present invention is not limited to the particular mode of practice described in the examples. In the following description of the present invention, a detailed description of known functions and configurations incorporated herein will be omitted when it may make the subject matter of the present invention rather unclear.

Figure 1A:
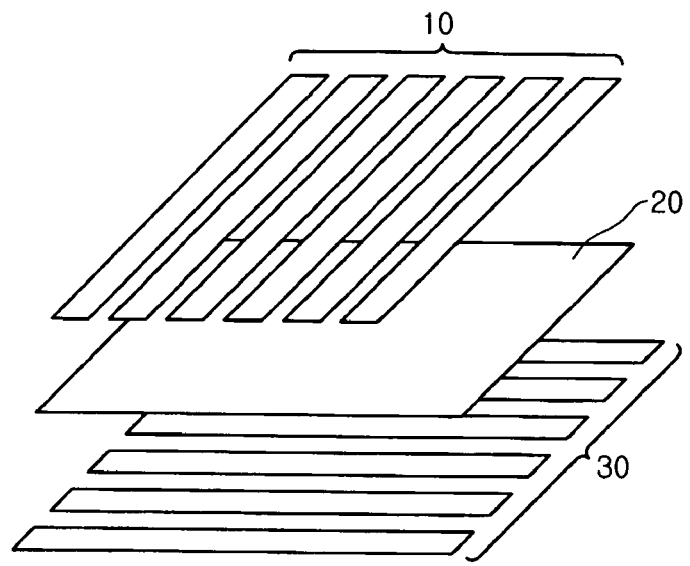
FIG. 1A illustrates the structure of the sensor according to the present invention.
Figure 1B:
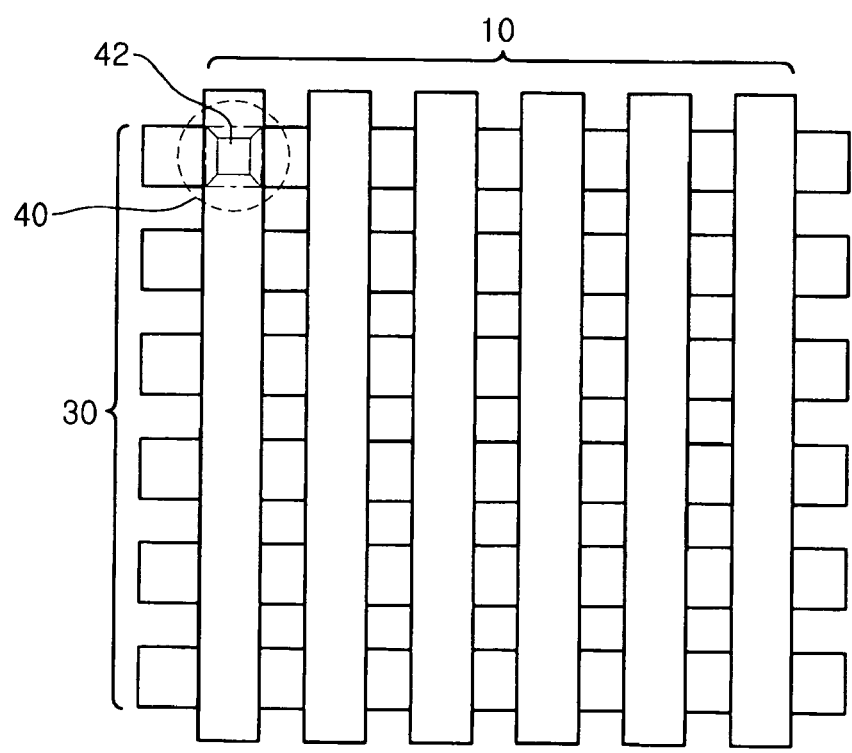
FIG. 1B is a plane figure of the sensor according to the present invention.

FIG. 1A illustrates the structure of the sensor according to the present invention, and FIG. 1B is a plane figure of the said sensor.

The capacitive sensor according to the present invention comprises an upper electrode layer (10) wherein a plurality of electrodes are disposed in line with each other; a lower electrode layer (30) wherein a plurality of electrodes are disposed in line with each other; and an insulating layer (20) disposed between said upper electrode layer and said lower electrode layer.

The electrodes in the upper electrode layer (10) and the electrodes in the lower electrode layer are disposed so that they would intersect at a certain angle. The sensors in FIG. 1A and FIG. 1B are disposed so that the electrodes of the upper electrode layer (10) and the lower electrode layer (30) would meet at right angles to form a lattice. The area where the electrodes of the upper electrode layer (10) and the lower electrode layer (30) meet forms a capacitance and thus another unit sensor (40).

A layer of bumps is formed on the upper surface of said unit sensor (40). When an object touches said layer of bumps (42), the capacitance of the upper electrode layer (10) and the lower electrode layer (30), which form the unit sensor (40), changes. Accordingly, the contact of any object can be detected by detecting the change in the capacitance of the unit sensor.

Figure 2A:
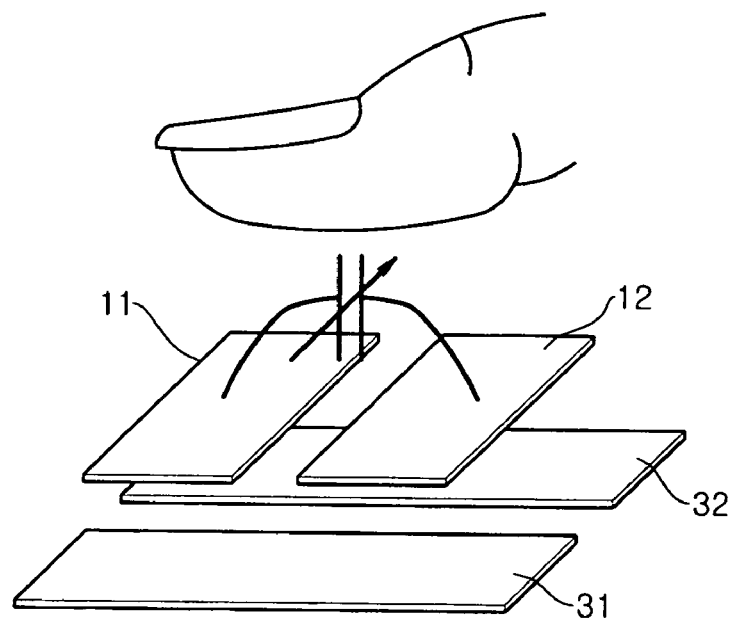
FIG. 2A illustrates the process of detecting tactile objects when the sensor according to the present invention operates in tactile mode.

FIG. 2A illustrates the process of detecting the object of contact by operating as tactile sensor according to the present invention. As shown in the figure, when pressure is applied to the area where the electrodes (12) of the upper electrode layer (10) and the electrodes (31) of the lower electrode layer (30) intersect, the insulating material (20, FIG. 1A) disposed between the upper electrode (12) and the lower electrode (31) is compressed. In such event, the capacitance of the area where pressure is not applied (e.g., the area where the upper electrode (11) and lower electrode (32) intersect) does not change.

Figure 2B:
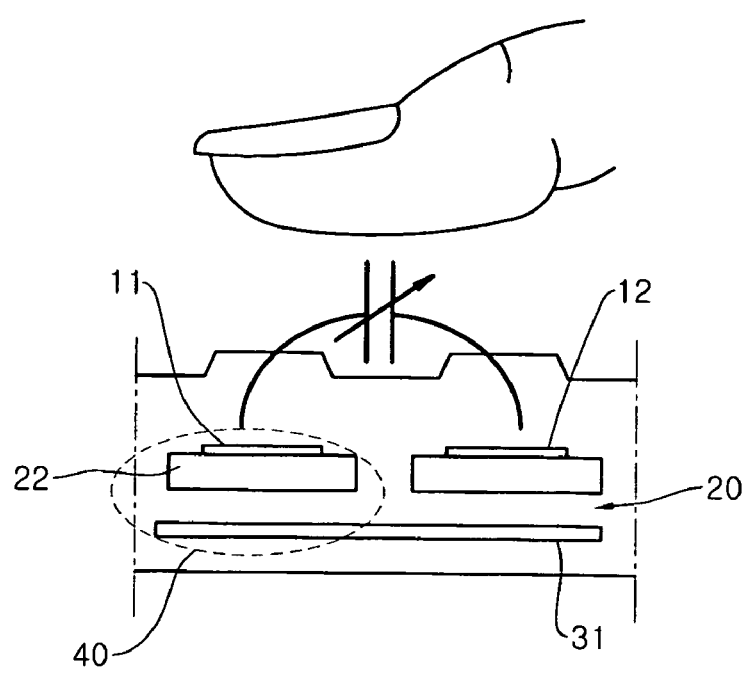
FIG. 2B is the sectional view of the sensor according to the present invention when it operates in tactile mode.

FIG. 2B is a sectional view of the sensor when the sensor operates as tactile sensor according to the present invention. As shown in FIG. 2B, if pressure is applied to the layer of bumps (42) above the area where the upper electrode (11) and the lower electrode (31) intersect, the PDMS (polydimethylsiloxane) layer (20) disposed between said upper electrode (11) and said lower electrode (31) and the air gap (22) are compressed, and the capacitance between the upper electrode (11) and the lower electrode (31) changes.

Compressible plastic layer material that can be compressed like PDMS, or an air gap (22) can be used for the insulating layer (20) of the sensor according to the present invention. Further, it is desirable that the outer surface of the sensor according to the present invention be covered by a protection layer made of insulating material so that the upper electrode layer (10) and the lower electrode layer (30) will be protected.

Figure 3A:
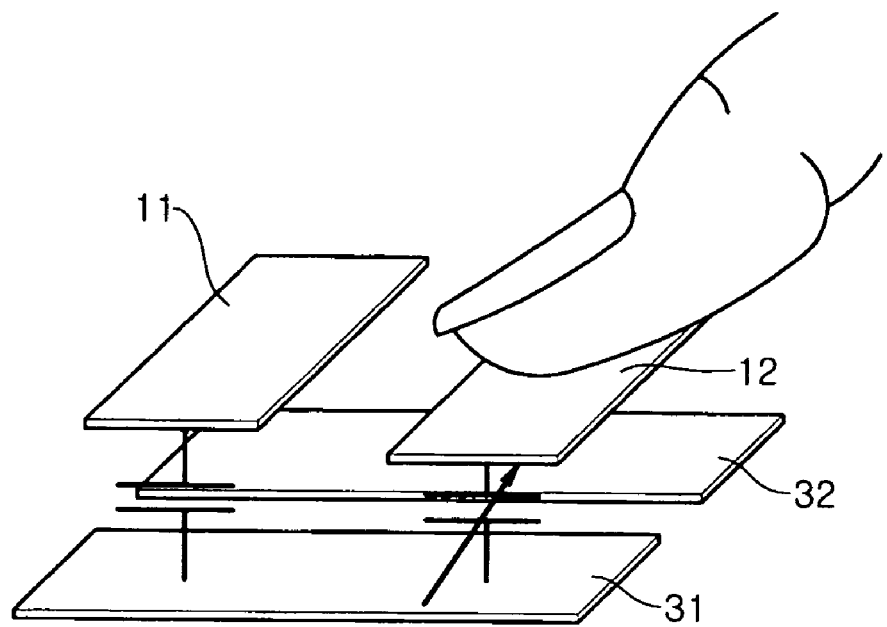
FIG. 3A illustrates the process of detecting proximate objects when the sensor according to the present invention operates in proximity mode.
Figure 3B:
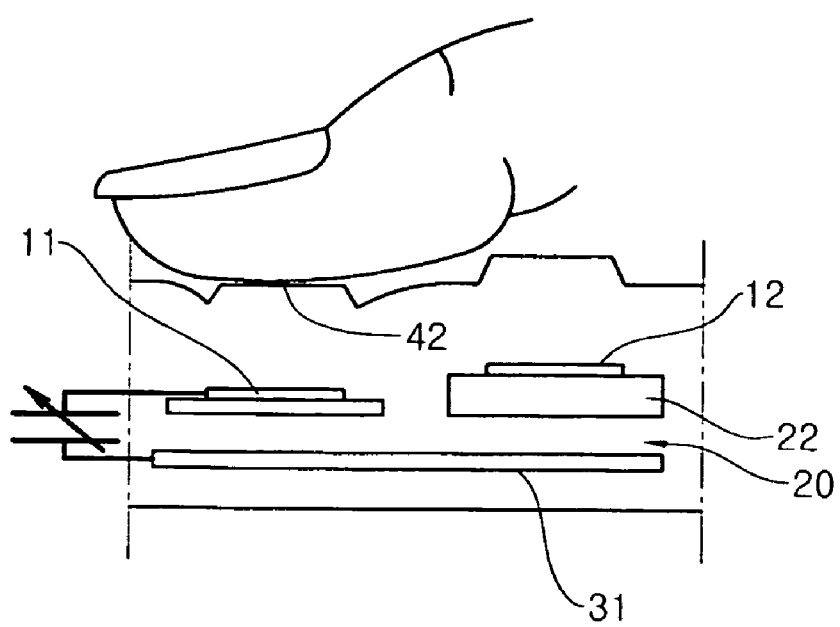
FIG. 3B is the sectional view of the sensor according to the present invention when it operates in proximity mode.

FIG. 3A illustrates the process of detecting approaching objects by operating as proximity sensor, and FIG. 3B is a sectional view of the sensor according to the present invention when operating as proximity sensor.

As shown in the foregoing figures, a capacitance is formed between the adjacent electrodes (11, 12) in the upper electrode layer (10). The above capacitance changes according to the existence of and the distance to the object above said electrodes (11, 12). This is because, when voltage is applied to each of the two electrodes (11, 12), an electrical field is formed in the space above the electrodes (11, 12), and the electrical field changes when an object approaches the space above the electrodes (11, 12).

Therefore, when an object approaches the space above the electrodes (11, 12), the proximity of the object can be detected and the distance between the sensor and said approaching object can be measured by detecting the change in the capacitance between the electrodes (11, 12).

Figure 4:
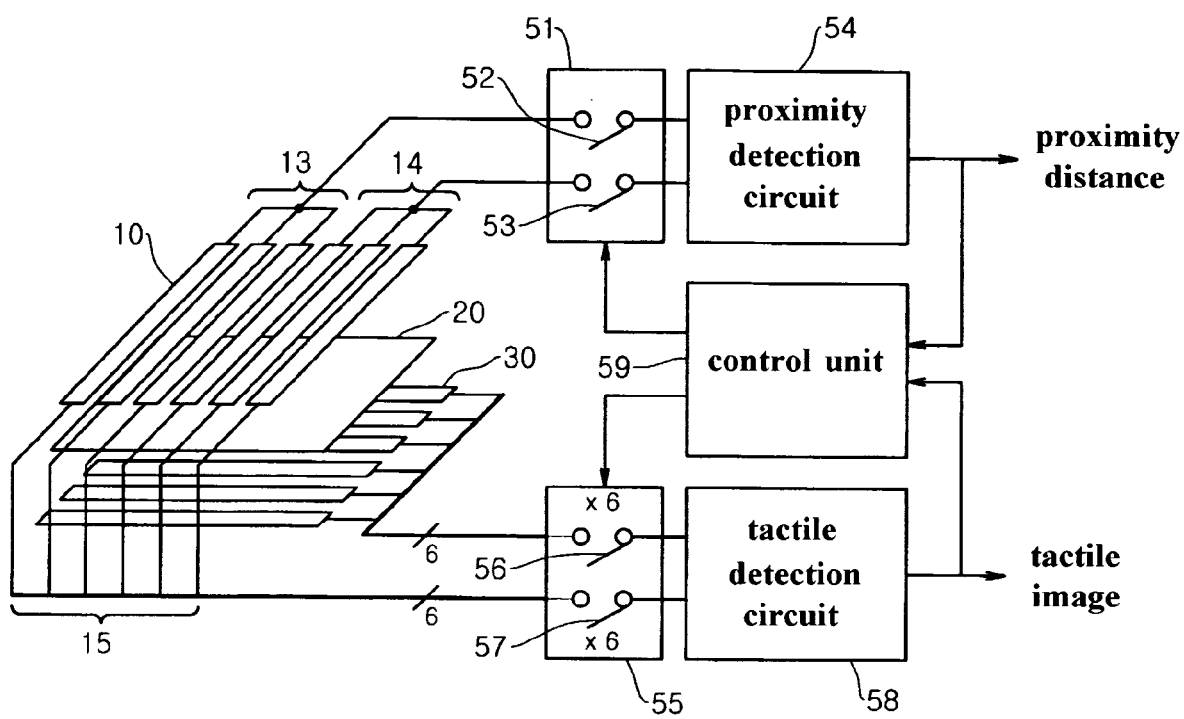
FIG. 4 illustrates the structure of the sensing system according to the present invention.

FIG. 4 illustrates the structure of the sensing system for operation of said sensor in proximity mode and tactile mode.

Because the sensing system according to the present invention employs the identical electrode for both proximity mode and tactile mode, it can select one of proximity mode and tactile mode for operation.

Said sensing system comprises a capacitive sensor comprising, an upper electrode layer (10) wherein a plurality of electrodes are disposed in line with each other; a lower electrode layer (30) wherein a plurality of electrodes are disposed in line with each other; and an insulating layer disposed between the upper electrode layer (10) and the lower electrode (30); a proximity detection circuit (54) which detects approaching objects using the fringe capacitance change between the electrode in the upper electrode layer and the electrode in the lower electrode layer; and a tactile detection circuit (58) which detects the contact of any object using the capacitance change between the upper electrode layer (10) and the lower electrode layer (30).

The electrodes of the upper electrode layer (20) are divided into two groups (13,14), and the electrodes within the same group are electrically connected to each other. Through this configuration, it can be assumed that there are two large scale electrodes (13, 14) in the upper electrode layer (10). The proximity detection circuit (54) is electrically connected to each of the electrodes of the two groups (13, 14) and is able to detect the proximity of objects through the capacitance change between the electrodes of the two groups (13, 14).

The tactile detection circuit (58) is electrically connected to each of the electrodes of the upper electrode layer (10) and the lower electrode layer (30), and detects the contact of any object through the capacitance change between the upper electrode layer (10) and lower electrode layer (30). In such event, each of the electrodes of the upper electrode layer (10) and the lower electrode layer (30) are configured so that they intersect, and form an independent unit sensor (40 of FIG. 1B). Therefore, the electrodes of the upper electrode layer (10) should not be electrically connected to each other, and the electrodes of the lower electrode layer (30) also should not be electrically connected to each other.

In the foregoing example, the electrodes (13) disposed to the left of the center of the upper electrode layer (10) are classified as Group 1 and those to the right (14) are classified as Group 2. However, the electrodes of the upper electrode layer (10) according to the present invention may be divided into two groups using other criteria.

Figure 5A:
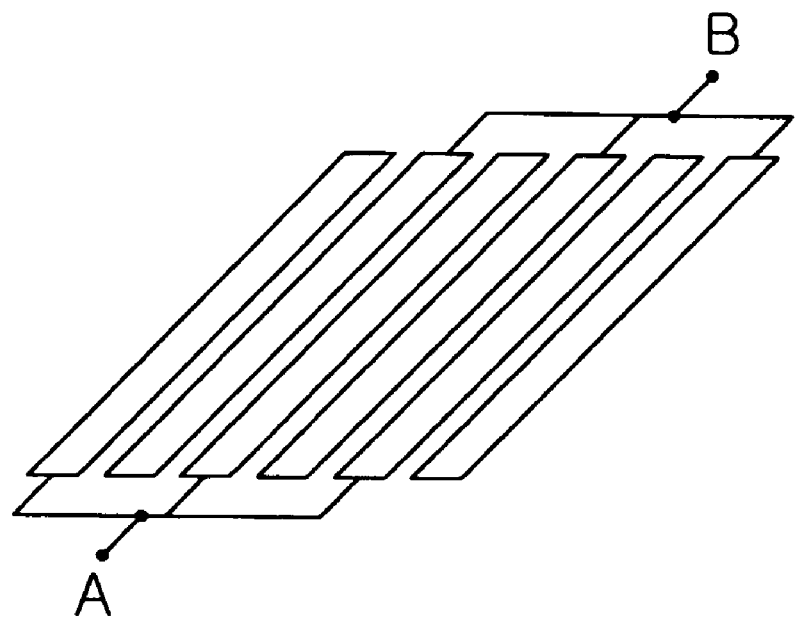
FIGS. 5A and 5B illustrate the example of dividing upper electrodes into two groups in the sensing system according to the present invention
Figure 5B:
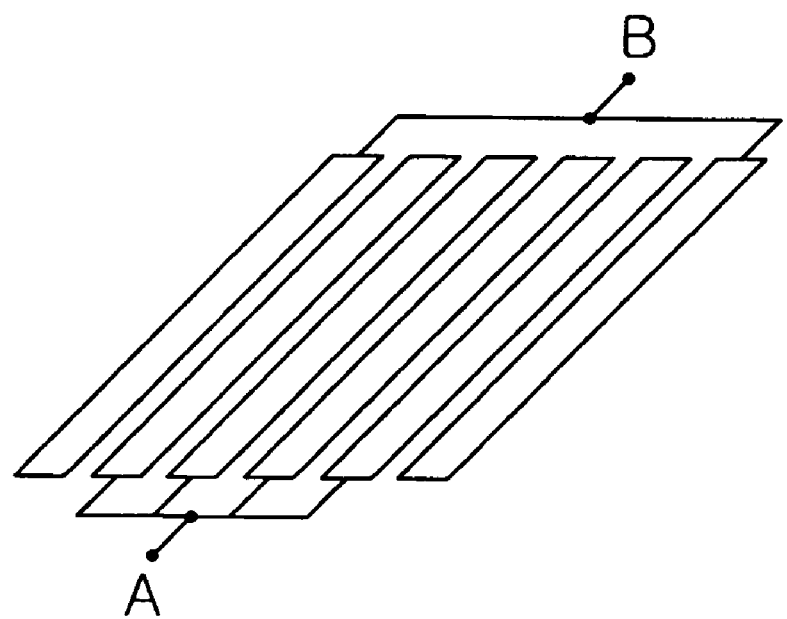

FIGS. 5A and 5B illustrate an example where the upper electrodes of the sensing system according to the present invention are divided into two groups. FIG. 5A illustrates an example wherein the electrodes of the upper electrode layer are each designated a number in the order disposed starting from the left end, and those designated an odd number are classified as Group 1 and those designated an even number are classified as Group 2. FIG. 5B illustrates an example wherein the electrodes of the upper electrode layer which are disposed at the left and right ends are classified as Group 1 (A) and the other electrodes are classified as Group 2 (B).

Referring to FIG. 4 again, among the two groups of electrodes (13, 14) shown in FIG. 4, the electrodes of Group 1 (13) are connected to the proximity detection circuit (54) by the first switch (52) of the Switch Unit 1 (51), and the electrodes of Group 2 are connected to the proximity detection circuit (54) by the second switch (52) of the Switch Unit 1 (51).

When the switches (52, 53) of Switch Unit (51) is turned on (in which event, Switch Unit 2 (55) will be turned off), the proximity detection circuit (54) is electrically connected to each of the two groups of electrodes (13, 14), and detects the proximity of objects by the capacitance change between the two groups of electrodes (13, 14).

Meanwhile, the electrodes of the upper electrode layer (10) are each connected to the tactile detection circuit (58) through the first switch (56) of Switch Unit 2 (55) simultaneously. Further, the electrodes of the lower electrode layer (30) are connected to each of the tactile detection circuit (58) through the second switch (57) of Switch Unit 2 (55).

When the switches (56, 57) of Switch Unit 2 (55) are turned on (in which event, Switch Unit 1 (51) is turned off), the tactile detection unit (58) is electrically connected to each of the electrodes of the upper electrode layer (10) and the lower electrode layer (30), and detects the contact of any object by the capacitance change between the upper electrode layer (10) and the lower electrode layer (30) for each unit sensor.

The foregoing sensing system may further comprise a control unit (59) which controls the operation of Switch Unit 1 (51) and Switch Unit 2 (55).

Said control unit (59) turns on Switch Unit 1 (51) and turns off Switch Unit 2 (55) so that the sensing system would normally operate in the proximity mode by the proximity detection circuit (54) to detect approaching objects.

If an object approaches the sensor while operating in the proximity mode, the proximity detection circuit (54) measures the distance to the approaching object. When the distance between the sensor and the approaching object is zero, the control unit (59) turns off Switch Unit 1 (51) and turns on Switch Unit 2 (55). Accordingly, the sensing system begins to operate in the tactile mode which detects the contact of objects through the tactile detection circuit (58).

Alternatively, the control unit (59) can cause the sensing system to operate in the proximity mode and the tactile mode in alternation at certain time intervals in the event an object approaches within a certain distance while operating in the proximity mode, so that the approaching distance and the contact pressure can both be detected.

The control unit (59) can automatically control Switch Unit 1 (51) and Switch Unit 2 (55) according to the output from the proximity detection circuit (54) and the tactile detection circuit (58). However, if necessary, the control unit (59) can be made to operate in the proximity mode or tactile mode at the election of the operator of the sensing system.

As discussed above, the sensor according to the present invention can operate as a proximity sensor when there is no contact with any object and measure the distance to the approaching object. When the sensor according to the present invention comes in contact with an object, it can measure the distribution of the pressure on the contact surface and produce the image obtained from such contact.

The sensor according to the present invention is a combination of the proximity sensor and the tactile sensor which are essential to robots, etc., and thus is very useful in connection with robots, etc. It can detect the approaching objects before it comes in contact with the robot, etc., and allow it to conduct the necessary operations before they are too close. It can operate as a tactile sensor when an object comes in contact and produce the image of the object in contact.

While the invention has been shown and described with reference to certain preferred embodiments thereof, it will be understood by those skilled in the art that various changes in form and details may be made thereto without departing from the spirit and scope of the invention as defined by the appended claims.

What is claimed is:

1. A capacitive sensor comprising
an upper electrode layer wherein a plurality of electrodes are disposed in line with each other;
a lower electrode layer wherein a plurality of electrodes are disposed in line with each other; and
an insulating layer disposed between said upper electrode layer and said lower electrode layer,
the capacitive sensor detecting the proximity of approaching objects by the capacitance change between the electrodes of the upper electrode layer, and detecting the contact of any object by the capacitance change between the electrode of the upper electrode layer and the electrode of the lower electrode layer,
wherein the electrodes of the upper electrode layer and the electrodes of the lower electrode layer are configured to be crossed at a certain angle, and
wherein the electrodes of the upper electrode layer and the electrodes of the lower electrode layer form an area and a layer of bumps made of insulating material is formed above the area.

2. The capacitive sensor of claim 1, wherein the electrodes of the upper electrode layer and the electrodes of the lower electrode layer are configured to be crossed at right angles.

3. The capacitive sensor of claim 1, wherein said insulating layer is made of compressible material.

4. A sensing system comprising:
a capacitive sensor comprising an upper electrode layer having a plurality of electrodes disposed in line with each other, a lower electrode layer having a plurality of electrodes disposed in line with each other, and an insulating layer disposed between said upper electrode layer and said lower electrode layer;
a proximity detection circuit wherein the electrodes of said upper electrode layer are classified into two groups, each of which is electrically connected to the proximity detection circuit, the proximity detection circuit detecting the proximity of approaching objects by the capacitance change between the two groups of electrodes; and
a tactile detection circuit electrically connected to each of the electrodes of the upper electrode layer and the lower electrode layer, the tactile detecting circuit detecting the contact of any object by the capacitance change between the electrodes of the upper electrode layer and the lower electrode layer,
wherein the two groups of electrodes of the upper electrode layer are each connected to the proximity detection circuit by switch unit 1;
wherein the electrodes of the upper electrode layer and the electrodes of the lower electrode layer are each connected to the tactile detection circuit by switch unit 2; and
further comprising a control unit which controls the operation of said switch unit 1 and switch unit 2.

5. The sensing system of claim 4,
wherein said control unit turns on the switch unit 1, and turns off the switch unit 2, thereby causing the sensing system to detect the proximity of the approaching object using the proximity detection circuit, and
wherein said control unit turns off the switch unit 1, and turns on the switch unit 2 when the distance to the approaching object detected by the proximity detection circuit is zero, thereby causing the sensing system to detect the contact of the object using the tactile detection circuit.

6. The sensing system of claim 4, wherein the electrodes of the upper electrode layer are classified into group 1 and group 2, wherein
the group 1 consists of electrodes disposed to the left of the center of the upper electrode layer, and the group 2 consists of the remaining electrodes; or the group 1 consists of the electrodes disposed at the left and right ends of the upper electrode layer, and the group 2 consists of the remaining electrodes; or the group 1 consists of electrodes designated an odd number and the group 2 consists of those designated an even number when the electrodes of the upper electrode layer are each designated a number in the order disposed starting from the left end.

7. The sensing system of claim 4, wherein the electrodes of the upper electrode layer and the electrodes of the lower electrode layer are configured to be crossed at a certain angle.

8. The sensing system of claim 7, wherein the electrodes of the upper electrode layer and the electrodes of the lower electrode layer are configured to be crossed at right angles.

9. The sensing system of claim 7, wherein a layer of bumps made of insulating material is formed above the area where the electrodes of the upper electrode layer and the lower electrode layer are crossed.

10. The sensing system of claim 7, wherein said insulating layer is made of compressible material.

11. The sensing system of claim 4,
wherein said control unit turns on the switch unit 1, and turns off the switch unit 2, thereby causing the sensing system to operate in a proximity detecting mode to detect the proximity of approaching objects using the proximity detection circuit, or said control unit turns off the switch unit 1, and turns on the switch unit 2, causing the sensing system to operate in a tactile detecting mode to detect the contact of objects using the tactile detection circuit; and said control unit controls the operation of the switch unit 1 and the switch unit 2 so that the system would operate in the proximity detecting mode and the tactile detecting mode in alternation when the object detected by the proximity detecting circuit approaches within a predetermined distance.

12. A sensing system comprising:

a capacitive sensor comprising an upper electrode layer having a plurality of electrodes disposed in line with each other, a lower electrode layer having a plurality of electrodes disposed in line with each other, and an insulating layer disposed between said upper electrode layer and said lower electrode layer;

a proximity detection circuit wherein the electrodes of said upper electrode layer are classified into two groups, each of which is electrically connected to the proximity detection circuit, the proximity detection circuit detecting the proximity of approaching objects by the capacitance change between the two groups of electrodes; and a tactile detection circuit electrically connected to each of the electrodes of the upper electrode layer and the lower electrode layer, the tactile detecting circuit detecting the contact of any object by the capacitance change between the electrodes of the upper electrode layer and the lower electrode layer, wherein the electrodes of the upper electrode layer are classified into group 1 and group 2, and wherein the group 1 consists of electrodes disposed to the left of the center of the upper electrode layer, and the group 2 consists of the remaining electrodes; or the group 1 consists of the electrodes disposed at the left and right ends of the upper electrode layer, and the group 2 consists of the remaining electrodes; or the group 1 consists of electrodes designated an odd number and the group 2 consists of those designated an even number when the electrodes of the upper electrode layer are each designated a number in the order disposed starting from the left end.

* * * * *